(12) United States Patent
Usuda et al.

(10) Patent No.: US 8,331,378 B2
(45) Date of Patent: Dec. 11, 2012

(54) TRANSMISSION RATE CONTROL METHOD, MOBILE STATION AND RADIO BASE STATION

(75) Inventors: Masafumi Usuda, Tokyo (JP); Anil Umesh, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 885 days.

(21) Appl. No.: 11/911,362

(22) PCT Filed: Apr. 13, 2006

(86) PCT No.: PCT/JP2006/307859
§ 371 (c)(1),
(2), (4) Date: Jan. 18, 2008

(87) PCT Pub. No.: WO2006/112367
PCT Pub. Date: Oct. 26, 2006

(65) Prior Publication Data
US 2008/0186928 A1    Aug. 7, 2008

(30) Foreign Application Priority Data
Apr. 18, 2005   (JP) .................................. 2005-120370

(51) Int. Cl.
*H04L 12/28* (2006.01)
(52) U.S. Cl. ................................................ 370/395.42
(58) Field of Classification Search .................. None
See application file for complete search history.

(56) References Cited

U.S. PATENT DOCUMENTS

| 7,089,017 B2* | 8/2006 | Chen et al. ............... 455/453 |
| 2002/0170013 A1 | 11/2002 | Bolourchi et al. |
| 2003/0064730 A1* | 4/2003 | Chen et al. ............... 455/453 |
| 2003/0065848 A1* | 4/2003 | Mori ....................... 710/113 |
| 2006/0159016 A1* | 7/2006 | Sagfors et al. ........... 370/230 |
| 2006/0221923 A1* | 10/2006 | Usuda et al. ............. 370/338 |
| 2007/0047500 A1* | 3/2007 | Usuda et al. ............. 370/335 |
| 2007/0049209 A1* | 3/2007 | Usuda et al. ............. 455/69 |
| 2008/0076442 A1* | 3/2008 | Ishii et al. ............... 455/453 |
| 2011/0075831 A1* | 3/2011 | Matsumura et al. ...... 379/380 |

FOREIGN PATENT DOCUMENTS

CN       1411295 A       4/2003
(Continued)

OTHER PUBLICATIONS

Samsung:"EUL Scheduling: signaling support" 3GPP RAN WG1 #38 BIS, vol. R1-041084, Sep. 20, 2004, pp. 1-6, XP 002366790.

(Continued)

*Primary Examiner* — Fan Ng
(74) *Attorney, Agent, or Firm* — Marvin A. Motsenbocker; Mots Law, PLLC

(57) ABSTRACT

A transmission rate control method according to the present invention includes: transmitting, at a radio base station, an absolute grant channel including a mobile station identifier; judging, at a mobile station, in accordance with the mobile station identifier included in the received absolute grant channel, whether or not the received absolute grant channel is addressed to the mobile station; and controlling, at the mobile station, a transmission rate in an uplink in accordance with the absolute grant channel when the judgment result is affirmative. The mobile station identifier differs based on each of priority levels.

4 Claims, 7 Drawing Sheets

FOREIGN PATENT DOCUMENTS

| | | |
|---|---|---|
| JP | 2001-339758 | 12/2001 |
| JP | 2002-374321 | 12/2002 |
| JP | 2003-179966 | 6/2003 |
| JP | 2004-222241 | 8/2004 |

OTHER PUBLICATIONS

Ericsson: "E-AGCH format" 3GPP TSG-RAN WG2 #46 BIS, [Online] vol. R-050936, Apr. 4, 2005, pp. 1-5, XP002515498.

Ericsson:"E-DCH Priority Based Scheduling" 3GPP TSG RAN WG2 Meeting #46, vol. R2-050438, Feb. 14, 2005, pp. 1-3, XP003003143.

Technical Specification Group Radio Access Network; FDD Enhanced Uplink: Physical Layer Aspects (Release 6) 3GPP TR 25.808 V0.2.3 Technical Report, Oct. 2004, pp. 1-20, XP002367156.

3GPP TS 25.211 V6.4.0 (Mar. 2005), Technical Specification, 3rd Generation Partnership Project; Technical Specification Group Radio Access Network; Physical channels and mapping of transport channels onto physical channels (FDD) (Release 6), p. 1-p. 59.

3GPP TS 25.309 V6.2.0 (Mar. 2005), Technical Specification, 3rd Generation Partnership Project; Technical Specification Group Radio Access Network; FDD Enhanced Uplink; Overall description; Stage 2 (Release 6), p. 1-p. 30.

3GPP TSG-RAN WG1 Meeting #40, R1-050219, "LS on E-AGCH contents", Scottsdale, Arizona, USA, Feb. 14-18, 2005.

The office action issued on Dec. 26, 2011 in the counterpart Chinese patent application.

* cited by examiner

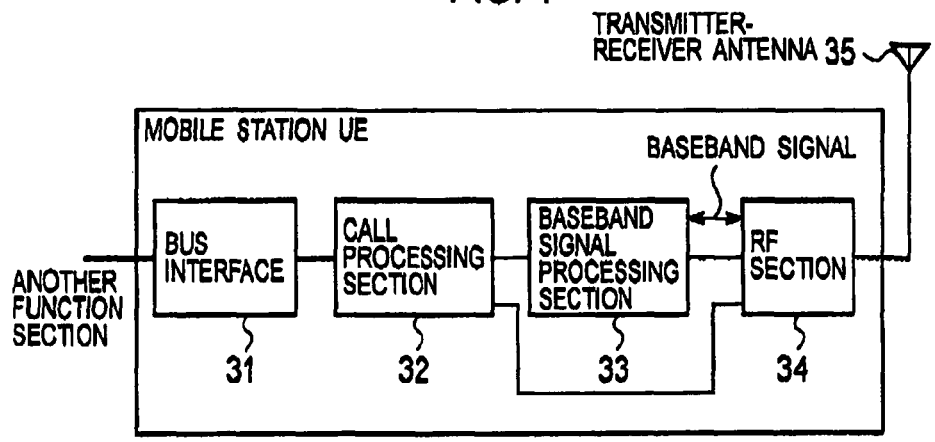
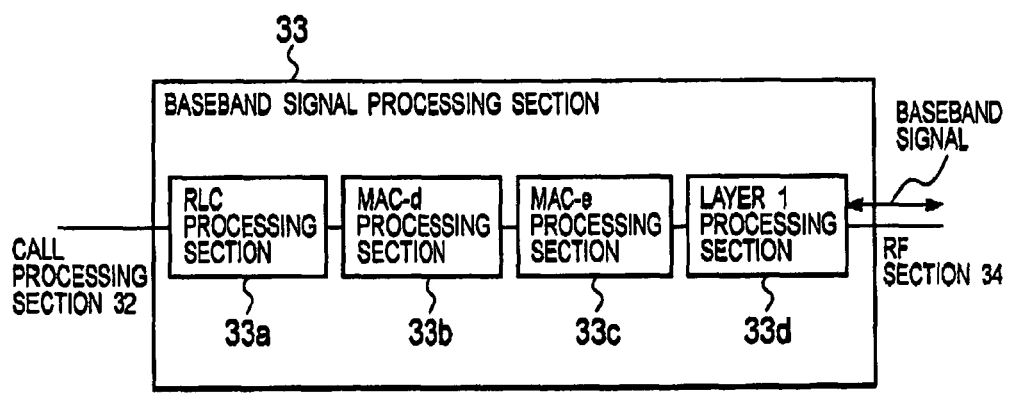
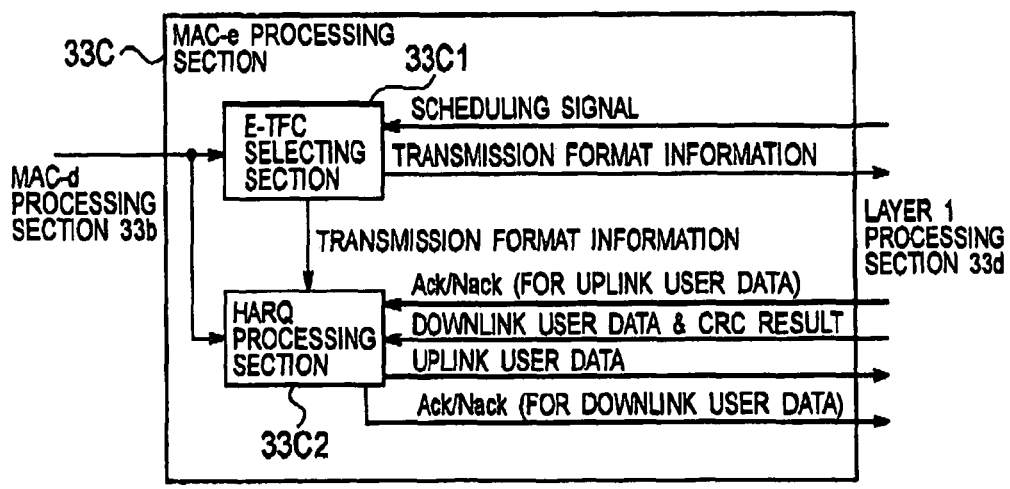

TRANSMISSION RATE CONTROL METHOD, MOBILE STATION AND RADIO BASE STATION

TECHNICAL FIELD

The present invention relates to a transmission rate control method, a mobile station, and a radio base station, for controlling a transmission rate in an uplink.

BACKGROUND ART

In a conventional mobile communication system, in an uplink from a mobile station UE to a radio base station Node B, a radio network controller RNC is configured to determine a transmission rate of a dedicated channel in consideration of radio resources of the radio base station Node B, an interference volume in an uplink, a transmission power of the mobile station UE, a transmission processing performance of the mobile station UE, a transmission rate required for an upper application, and the like, and to notify the determined transmission rate of the dedicated channel by a message in a layer-3 (Radio Resource Control Layer) to both of the mobile station UE and the radio base station Node B.

Here, the radio network controller RNC is provided at an upper level of the radio base station Node B, and is an apparatus configured to control the radio base station Node B and the mobile station UE.

In general, data communications often cause burst traffic compared with voice communications or TV communications. Therefore, it is preferable that the transmission rate of a channel used for the data communications is changed fast.

However, as shown in FIG. 11, the radio network controller RNC integrally controls a plurality of radio base stations Node B in general. Therefore, in the conventional mobile communication system, there has been a problem that it is difficult to perform fast control for changing the transmission rate of channel (for example, per approximately 1 through 100 ms), due to processing load, processing delay, or the like.

In addition, in the conventional mobile communication system, there has also been a problem that costs for implementing an apparatus and for operating a network are substantially increased even if the fast control for changing of the transmission rate of the channel can be performed.

Therefore, in the conventional mobile communication system, control for changing the transmission rate of the channel is generally performed on the order from a few hundred ma to a few seconds.

Accordingly, in the conventional mobile communication system, when burst data transmission is performed as shown in FIG. 12(a), the data are transmitted by accepting low-speed, high-delay, and low-transmission efficiency as shown in FIG. 12(b), or, as shown in FIG. 12(c), by reserving radio resources for high-speed communications to accept that radio bandwidth resources in an unoccupied state and hardware resources in the radio base station Node B are wasted.

It should be noted that both of the above-described radio bandwidth resources and hardware resources are applied to the vertical radio resources in FIG. 12.

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer 1 and a media access control (MAC) sub-layer (a layer-2) between the radio base station Node B and the mobile station UE, so as to utilize the radio resources effectively. Such discussions or discussed functions will be hereinafter referred to as "Enhanced Uplink (EUL)".

In the EUL, a channel for transmitting a transmission power ratio between an Enhanced Dedicated Physical Data Channel (E-DPDCH) and a Dedicated Physical Control Channel (DPCCH) from a radio base station to each mobile station (i.e., an absolute rate control channel (E-AGCH: EDCH-Absolute Grant Channel)) is defined. (e.g., refer to non-patent document 1)

In addition to the above-described transmission power ratio, the a signal process flag is attached to the E-AGCH. The signal process flag distinguishes between methods in which the E-AGCH is applicable by each HARQ (Hybrid Automatic Repeat Request) processes respectively, and methods in which the E-AGCH is applicable for all of the HARQ processes. (e.g., refer to non-patent document 2)

In this regard, on the E-AGCH, the radio base station masks 16-bit CRC sequence by the identifier of the destination mobile station (E-RNTI: Enhanced-Radio Network Temporary Indicator) and attaches the masking result to information bits (transmission data). Then, the destination mobile station (mobile station identified by the E-RNTI) performs a CRC error detection processing by performing an FEC decoding against the E-AGCH and unmasking the extracted CRC sequence by own E-RNTI. Thus, the destination mobile station enables to detect the status that the signals transmitted to the own station are received correctly.

However, since an impact on the downlink caused by transmitting the E-AGCH is large, there has been a problem that the radio base station cannot transmit transmission data larger than limited number of bits (data size).

Accordingly, it is recommended that the transmission data (information bits) to be mapped to the E-AGCH is limited as 9 to 10 bits at most, thereby the transmission power ratio is reduced. (refer to non-patent document 3)

However, in addition to the above-described transmission power ratio and the signal process flag, a priority level, for example, should be mapped to the E-AGCH as the transmission data. Therefore, there has been a problem that, since the priority level generally has a value between 8 and 16, when the transmission data of 3 to 4 bits are mapped to the E-AGCH, the number of bits of the E-AGCH increases, thereby a required transmission power increases.

(Non-patent Document 1) 3GPP TSG-RAN TS25.211 v6.4.0

(Non-patent Document 2) 3GPP TSG-RAN TS25.309 v0.2.0

(Non-patent Document 3) 3GPP R1-050219

DISCLOSURE OF THE INVENTION

The present invention has been made in view of the above-mentioned problems, and its object is to provide a transmission rate control method, a mobile station, and a radio base station that makes it possible to reduce deterioration in a downlink capacity by minimizing an overhead of an E-AGCH by not allocating a priority level as independent bits to the E-AGCH.

A first aspect of the present invention is summarized as a transmission rate control method, including: transmitting, at a radio base station, an absolute grant channel including a mobile station identifier; judging, at a mobile station, in accordance with the mobile station identifier included in the received absolute grant channel, whether or not the received absolute grant channel is addressed to the mobile station; and controlling, at the mobile station, a transmission rate in an uplink in accordance with the absolute grant channel when the judgment result is affirmative; wherein the mobile station identifier differs based on each of priority levels.

In the first aspect of the present invention, each of the priority levels may be configured not to be used in a dedicated absolute grant channel, but to be used in a common absolute grant channel.

A second aspect of the present invention is summarized as a mobile station configured to control a transmission rate in an uplink, including: a receiver configured to receive an absolute grant channel including a mobile station identifier from a radio base station; a judging section configured to judge, in accordance with the mobile station identifier included in the received absolute grant channel, whether or not the received absolute grant channel is addressed to the mobile station; and a controller configured to control the transmission rate in the uplink in accordance with the absolute grant channel when the judgment result is affirmative; wherein the mobile station identifier differs based on each of priority levels.

A third aspect of the present invention is summarized as a radio base station configured to control a transmission rate in an uplink, wherein the radio base station is configured to transmit a common absolute grant channel including a mobile station identifier which differs based on each of priority levels.

BRIEF DESCRIPTION OF THE DRAWINGS

FIG. 1 is a functional block diagram of a mobile station of a mobile communication system according to a first embodiment of the present invention.

FIG. 2 is a functional block diagram of a baseband signal processing section in the mobile station of the mobile communication system according to the first embodiment of the invention.

FIG. 3 is a functional block diagram of a MAC-e processing section of the baseband signal processing section in the mobile station of the mobile communication system according to the first embodiment of the present invention.

BEST MODES FOR CARRYING OUT THE INVENTION (Mobile Communication System According to First Embodiment of the Present Invention)

Figure 11:
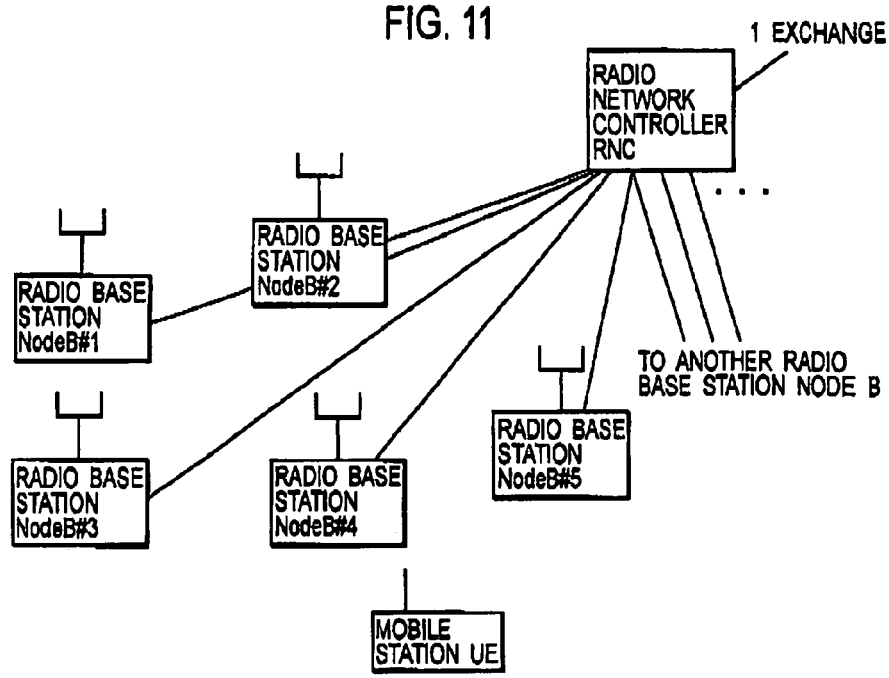
FIG. 11 is a diagram showing an entire configuration of a general mobile communication system.
Figure 12:
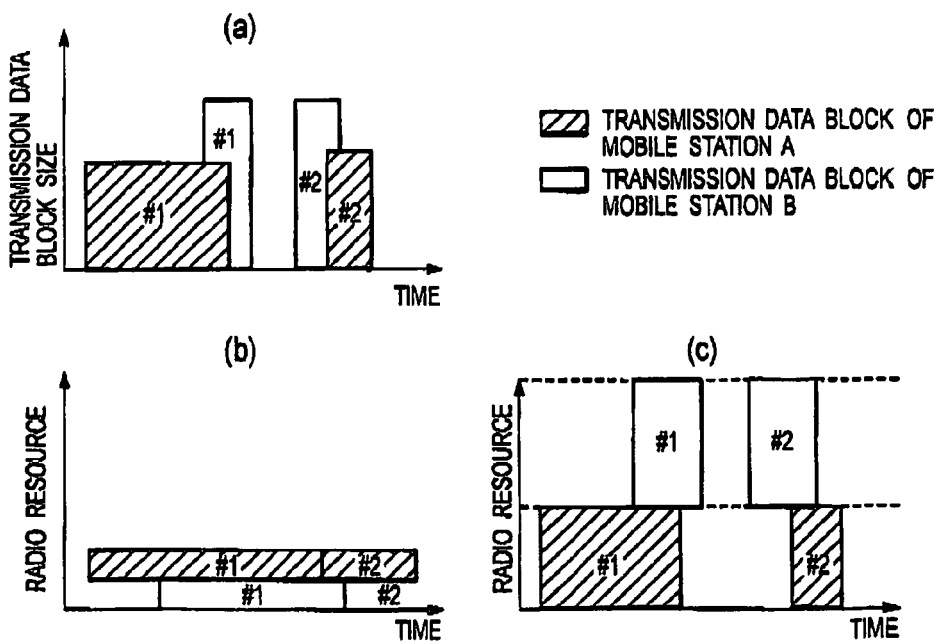
FIGS. 12($a$) to 12($c$) are graphs illustrating operations at a time of burst data transmission in a conventional mobile communication system.

A description will be given of a configuration of a mobile communication system according to a first embodiment of the present invention with reference to FIGS. 1 to 8. It should be noted that, as shown in FIG. 11, the mobile communication system according to this embodiment is provided with a plurality of radio base stations Node B #1 to Node B #5 and a radio network controller RNC.

In addition, in the mobile communication system according to this embodiment, a "High Speed Downlink Packet Access (HSDPA)" is used in a downlink, and an "Enhanced Uplink (EUL)" is used in an uplink. It should be noted that in both of the HSDPA and the EUL, retransmission control (N process stop and wait) shall be performed by an HARQ (Hybrid Automatic Repeat Request).

Therefore, an Enhanced Dedicated Physical Channel (E-DPCH), configured of an Enhanced Dedicated Physical Data Channel (E-DPDCH) and an Enhanced Dedicated Physical Control Channel (E-DPCCH), and a Dedicated Physical Channel (DPCH), configured of a Dedicated Physical Data Channel (DPDCH) and a Dedicated Physical Control Channel (DPCCH), are used in the uplink.

Here, the E-DPCCH transmits EUL control data such as a transmission format number for defining a transmission format (transmission block size, or the like) of the E-DPDCH, HARQ related information (the number of retransmission, or the like), and scheduling related information (a transmission power, a buffer residence-volume, or the like in the mobile station UE).

In addition, the E-DPDCH is paired with the E-DPCCH, and transmits user data for the mobile station UE based on the EUL control data transmitted through the E-DPCCH.

The DPCCH transmits control data such as a pilot symbol used for RAKE combining, an SIR measurement, or the like, a Transport Format Combination Indicator (TFCI) for identifying a transmission format of the uplink DPDCH, and control data such as transmission power control bits in a downlink, or the like.

In addition, the DPDCH is paired with the DPCCH, and transmits user data for the mobile station UE based on the control data transmitted through the DPCCH. However, if user data to be transmitted does not exist in the mobile station UP, the DPDCH can be configured not to be transmitted.

In addition, in the uplink, a "High Speed Dedicated Physical Control Channel (HS-DPCCH)" and a random access channel (RACH), which are required when the HSPDA is applied, are also used.

The HS-DPCCH transmits a Channel Quality Indicator (CQI), and a transmission acknowledgement signal (Ack or Neck) for the HS-DPCCH.

As shown in FIG. 1, the mobile station UE according to this embodiment is provided with a bus interface 31, a call processing section 32, a baseband processing section 33, a radio frequency (RF) section 34, and a transmission-reception antenna 35.

These functions can be independently present as hardware, and can be partly or entirely integrated, or can be configured through a process of software.

The bus interface 31 is configured to forward user data output from the call processing section 32 to another functional section (for example, an application related functional section). In addition, the bus interface 31 is configured to forward user data transmitted from another functional section (for example, the application related functional section) to the call processing section 32.

The call processing section 32 is configured to perform a call control processing for transmitting and receiving user data.

The baseband signal processing section 33 is configured to transmit user data to the call processing section 32, the user data acquired by performing a layer-1 processing including a despreading processing, a RAKE combining processing, and an FEC (Forward Error Correction) decoding processing, a MAC (Media Access Control) processing including a MAC-e processing and a MAC-d processing, and a "Radio Link Control (RLC)" processing, against the baseband signals transmitted from the RF section 34.

In addition, the baseband signal processing section 33 is configured to generate the baseband signals by performing the RLC processing, the MAC processing, or the layer-1 processing against the user data transmitted from the call processing section 32 so as to transmit the baseband signals to the RF section 34.

Detailed description of the functions of the baseband signal processing section 33 will be given later. The RF section 34 is configured to generate baseband signals by performing the detection processing, the filtering processing, the quantization processing, or the like against radio frequency signals received through the transmission-reception antenna 35, so as to transmit the generated baseband signals to the baseband signal processing section 33. In addition, the RF section 34 is configured to convert the baseband signals transmitted from the baseband signal processing section 33 into the radio frequency signals.

As shown in FIG. 2, the baseband signal processing section 33 is provided with an RLC processing section 33a, a MAC-d processing section 33b, a MAC-e processing section 33c, and a layer-1 processing section 33d.

The RLC processing section 33a is configured to perform a processing (RLC processing) in an upper layer of a layer-2, against the user transmitted from the call processing section 32, and to transmit the user data to the MAC-d processing section 33b.

The MAC-d processing section 33b is configured to attach a channel identifier header and to generate a transmission format in the uplink based on the transmission power limit in the uplink.

As shown in FIG. 3, the MAC-e processing section 33c is provided with an Enhanced Transport Format Combination (E-TFC) selecting section 33c1 and an HARQ processing section 33c2.

The E-TFC selecting section 33c1 is configured to determine a transmission format (E-TFC) of the E-DPDCH and a transmission format (E-TFC) of the E-DPCCH based on scheduling signals (such as the E-AGCH, the E-RGCH, or the like) transmitted from the radio base station Node B.

In addition, the E-TFC selecting section 33c1 is configured to transmit transmission format information on the determined transmission format (that is, a transmission data block size, a transmission power ratio between the E-DPDCH and the DPCCH, or the like) to the layer-1 processing section 33d, as well as to transmit the determined transmission format information to the HARQ processing section 33c2.

Such scheduling signals are information notified in the cell where the mobile station UE is located, and include control information for all the mobile stations located in the cell, or a specific group of the mobile stations located in the cell.

The HARQ processing section 33c2 is configured to perform process control for the "stop-and-wait of N-process", and to transmit the user data in the uplink based on the transmission acknowledgement signal (Ack/Nack for uplink data) transmitted from the radio base station Node B.

Specifically, the HARQ processing section 33c2 is configured to determine whether or not reception processing of the downlink user data was successful, based on a "Cyclic Redundancy Check (CRC)" result entered from the layer-1 processing section 33d.

Then, the HARQ processing section 33c2 is configured to generate a transmission acknowledgement signal (Ack/Nack for the downlink user data) based on the determined result, so as to transmit the acknowledgement signal to the layer-1 processing section 33d.

In addition, when the above-described determination result was "OK", the HARQ processing section 33c2 transmits the downlink user data entered from the layer-1 processing section 33d, to the MAC-d processing section 33d.

Figure 4:
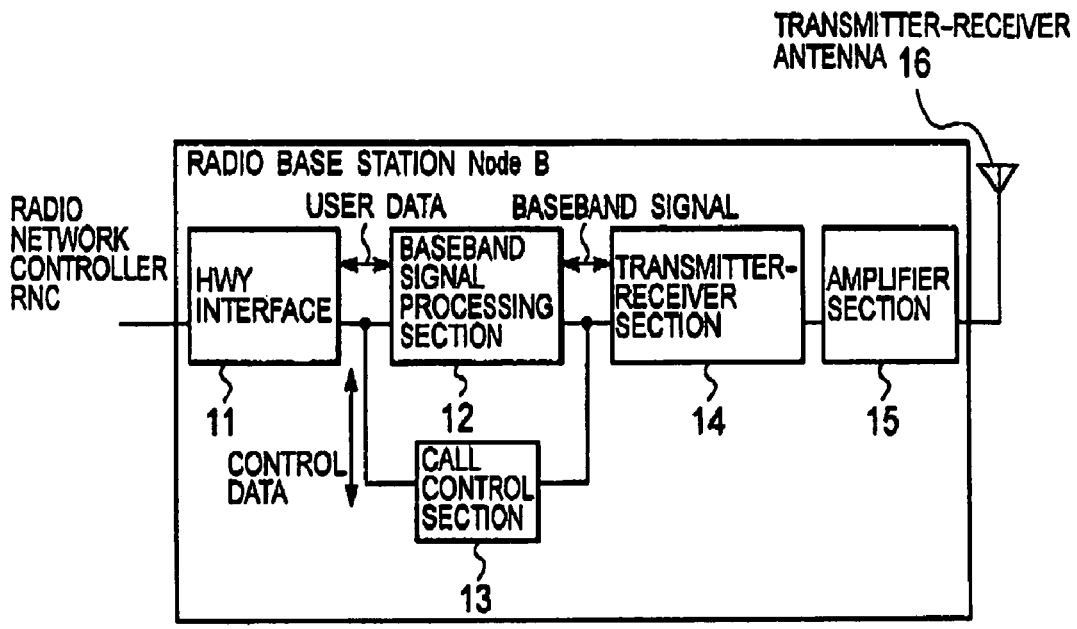
FIG. 4 is a functional block diagram of a radio base station of the mobile communication system according to the first embodiment of the present invention.

As shown in FIG. 4, the radio base station Node B according to this embodiment is provided with an HWY interface 11, a baseband signal processing section 12, a call control section 13, at least one transmitter-receiver section 14, at least one amplifier section 15, and at least one transmission-reception antenna 16.

The HWY interface 11 is an interface with a radio network controller RNC. Specifically, the HWY interface 11 is configured to receive user data transmitted from the radio network controller RNC to a mobile station UE via a downlink, so as to enter the user data to the baseband signal processing section 12.

In addition, the HWY interface 11 is configured to receive control data for the radio base station Node B from the radio network controller RNC, so as to enter the received control data to the call control section 13.

In addition, the HWY interface 11 is configured to acquire the user data from the baseband signal processing section 12, the user data included in the uplink signals received from a mobile station UE via an uplink, so as to transmit the acquired user data to the radio network controller RNC. Further, the HWY interface 11 is configured to acquire the control data for the radio network controller RNC from the call control section 13, so as to transmit the acquired control data to the radio network controller RNC.

The baseband signal processing section 12 is configured to generate baseband signals by performing the RLC processing, the MAC processing (the MAC-d processing or the MAC-e processing), or the layer-1 processing against the user data acquired from the HWY interface 11, so as to forward the generated baseband signals to the transmitter-receiver section 14.

Here, the MAC processing in the downlink includes an HARQ processing, a scheduling processing, a transmission rate control processing, or the like. In addition, the layer-1 processing in the downlink includes a channel encoding processing of user data, a spreading processing, or the like.

In addition, the baseband signal processing section 12 is configured to extract user data by performing the layer-1 processing, the MAC processing (the MAC-d processing or the MAC-e processing), or the RLC processing against the baseband signals acquired from the transmitter-receiver section 14, so as to forward the extracted user data to the HWY interface 11.

Here, the MAC processing in the uplink includes the HARQ processing, the scheduling processing, the transmission rate control processing, a header disposal processing, or the like. In addition, the layer-1 processing in the uplink includes a despreading processing, a RAKE combining processing, an error correction decoding processing, or the like.

Detailed description of the functions of the baseband signal processing section 12 will be given later.

In addition, the call control section 13 is configured to perform the call control processing based on the control data acquired from the HWY interface 11.

The transmitter-receiver section 14 is configured to perform processing of converting baseband signals into radio frequency signals (downlink signals), the radio frequency signals acquired from the baseband signal processing section 12, so as to transmit the converted radio frequency signals to the amplifier section 15.

In addition, the transmitter-receiver 14 is configured to perform processing of converting the radio frequency signals (uplink signals) into the baseband signals, the radio frequency signals acquired from the amplifier section 15, so as to transmit the converted baseband signals to the baseband signal processing section 12.

The amplifier section 15 is configured to amplify the downlink signals acquired from the transmitter-receiver section 14, so as to transmit the amplified downlink signals to the mobile station UE via the transmission-reception antenna 16. In addition, the amplifier 15 is configured to amplify the uplink signals received by the transmission-reception antenna 16, so as to transmit the amplified uplink signals to the transmitter-receiver section 14.

Figure 5:
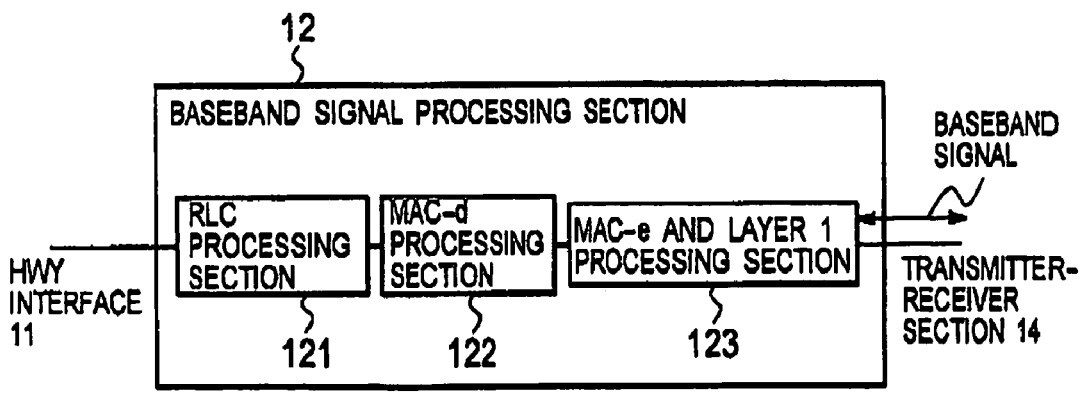
FIG. 5 is a functional block diagram of the baseband signal processing section in a radio base station of the mobile communication system according to the first embodiment of the present invention.

As shown in FIG. 5, the baseband signal processing section 12 is provided with an RLC processing section 121, a MAC-d processing section 122, and a MAC-e and layer-1 processing section 123.

The MAC-e and layer-1 processing section 123 is configured to perform the despreading processing, a RAKE combining processing, an error correction decoding processing, an HARQ processing, or the like, against the baseband signals acquired from the transmitter-receiver section 14. However, these functions are not clearly divided per hardware, and can be acquired by software.

The MAC-d processing section 122 is configured to perform such as a header disposal processing, or the like, against output signals from the MAC-a and layer-1 processing section 123.

The RLC processing section 121 is configured to perform such as a retransmission control processing in the RLC layer, a reconstruction processing in an RLC-SD, or the like, against the output signals from the MAC-d processing section 122.

However, these functions are not clearly divided per hardware, and can be acquired by software.

Figure 6:
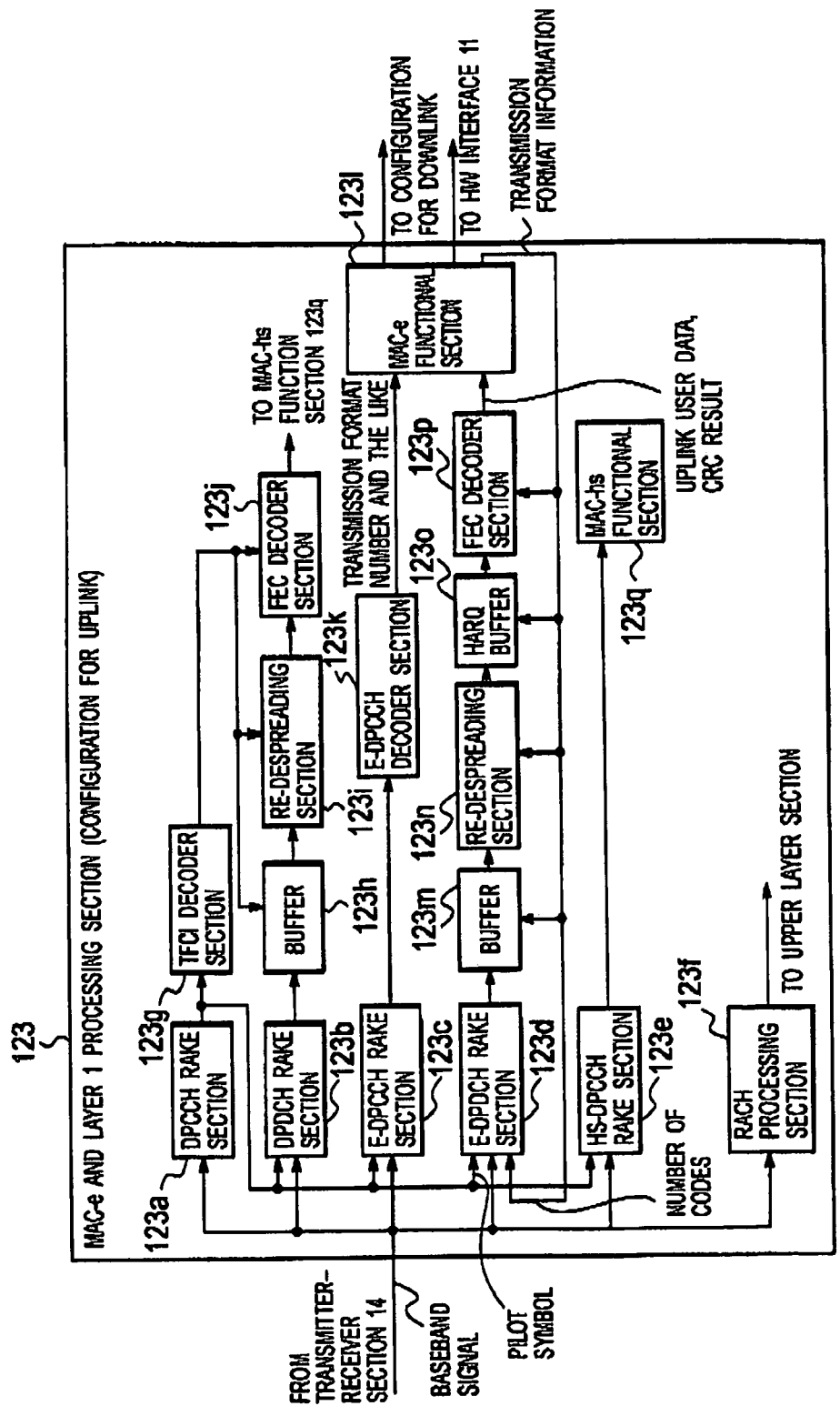
FIG. 6 is a functional block diagram of a MAC-e and Layer 1 processing section (configuration for uplink), of the baseband signal processing section in the radio base station of the mobile communication system according to the first embodiment of the invention.

As shown in FIG. 6, the MAC-e and layer-1 processing section (configuration for the uplink) 123 is provided with a DPCCH RAKE section 123a, a DPDCH RAKE section 123b, an E-DPCCH RAKE section 123c, an E-DPDCH RAKE section 123d, an HS-DPCCH RAKE section 123e, an RACH processing section 123f, a TFCI decoder section 123g, buffers 123h and 123m, re-despreading sections 123i and 123n, FEC decoder sections 123j and 123p, an E-DPCCH decoder section 123k, a MAC-e functional section 123l, an HARQ buffer 123o, a MAC-hs functional section 123q.

The E-DPCCH RAKE section 123c is configured to perform, against the E-DPCCH in the baseband signals transmitted from the transmitter-receiver section 14, a despreading processing and a RAKE combining processing using a pilot symbol included in the DPCCH.

The E-DPCCH decoder section 123k is configured to acquire transmission format number related information, HARQ related information, scheduling related information, or the like, by performing the decoding processing against the RAKE combining outputs of the E-DPCCH RAKE section 123c, so as to enter the acquired information to the MAC-e functional section 123l.

The E-DPDCH RAKE section 123d is configured to perform, against the E-DPDCH in the baseband signals transmitted from the transmitter-receiver section 14, a despreading processing using the transmission format information (the number of codes) transmitted from the MAC-e functional section 123l and the RAKE combining processing using the pilot symbol included in the DPCCH.

The buffer 123m is configured to store the RAKE combining outputs of the E-DPDCH RAKE section 123d based on the transmission format information (the number of symbols) transmitted from the MAC-E functional section 123l.

The re-despreading section 123n is configured to perform a despreading processing against the RAKE combining outputs of the E-DPDCH RAKE section 123d stored in the buffer 123m, based on the transmission format information (spreading factor) transmitted from the MAC-e functional section 123l.

The HARQ buffer 123o is configured to store the despreading processing outputs of the re-despreading section 123n, based on the transmission format information transmitted from the MAC-e functional section 123l.

The FEC decoder section 123p is configured to perform an error correction decoding processing (the FEC decoding processing) against the despreading processing outputs of the re-despreading section 123n stored in the HARQ buffer 123o, based on the transmission format information (the transmission data block size) transmitted from the MAC-e functional section 123l.

The MAC-e functional section 123l is configured to calculate and output the transmission format information (the number of codes, the number of symbols, the spreading factor, the transmission data block size, and the like) based on the transmission format number related information, the HARQ related information, the scheduling related information, and the like, which are acquired from the E-DPCCH decoder section 123k.

Figure 7:
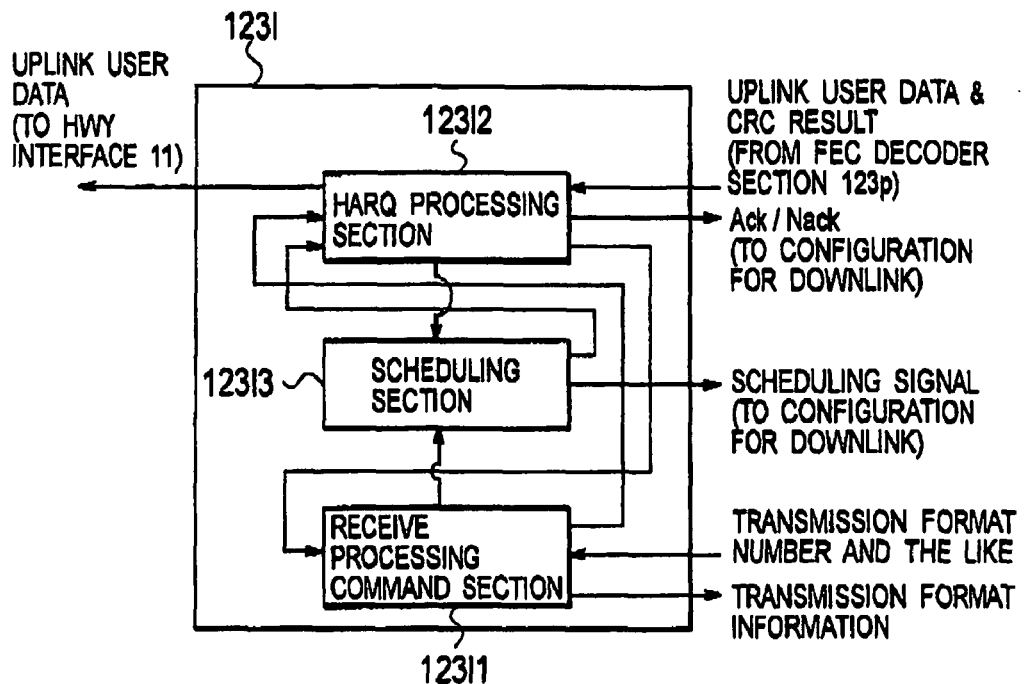
FIG. 7 is a functional block diagram of a MAC-e functional section of the MAC-E and layer 1 processing section (configuration for uplink), of the baseband signal processing section in a radio base station of the mobile communication system according to the first embodiment of the present invention.

In addition, as shown in FIG. 7, the MAC-e functional section 123/1 is provided with a receive processing command section 123/1, an HARQ processing section 123/2, and a scheduling section 123/3.

The receive processing command section 123/1 is configured to transmit the transmission format number related information, the HARQ related information, and the scheduling related information, which am entered from the E-DPCCH decoder section 123k, to the HARQ control section 123/2.

In addition, the receive processing command section 123/1 is configured to transmit the scheduling related information entered from the E-DPCCH decoder 123k, to the scheduling section 123/3.

Further, the receive processing command section 123/1 is configured to output the transmission format information corresponding to the transmission format number entered from the E-DPCCH decoder section 123k.

The HARQ control section 123/2 is configured to determine whether or not the reception processing of uplink user data has been successful, based on the CRC result entered from the FEC decoder section 123p. Then, the HARQ control section 123/2 is configured to generate a transmission acknowledgement signal (Ack or Nack) based on the determination result, so as to transmit the generated acknowledgement signal to the configuration for the downlink of the baseband signal processing section 12. In addition, the HARQ control section 123/2 is configured to transmit the uplink user data entered from the FEC decoder section 123p to the radio network controller RNC, when the above determination result has been "OK".

In addition, when the above determination result is "OK", the HARQ control section 123/2 is configured to clear soft decision information stored in the HARQ buffer 123o. On the other hand, the HARQ control section 123/2 is configured to store the uplink user data in the HARQ buffer 123o, when the above determination result is "NG".

In addition, the HARQ control section 123/2 is configured to forward the above determination result to the receive processing command section 123/1. The receive processing control command section 123/1 is configured to notify the E-DPDCH RAKE section 123d and the buffer 123m, of a hardware resource to be prepared for the following transmission time interval (TTI), so as to perform notification for reserving the resource in the HARQ buffer 123o.

In addition, when the uplink user data is stored in the buffer 123m per TTI, the receive processing command section 123/1 is configured to instruct the HARQ buffer 123o and the FEC decoder section 123p to perform the FEC decoding processing after concatenating the newly received uplink user data and the uplink user data, which is stored in the HARQ buffer 123o, in a process corresponding to the TTI.

The scheduling section 123/3 is configured to transmit scheduling signals (such as the E-AGCH, an Relative Rate Control Channel (E-DCH Relative Grant Channel: E-RGCH), or the like) through the configuration for the uplink.

Figure 8:
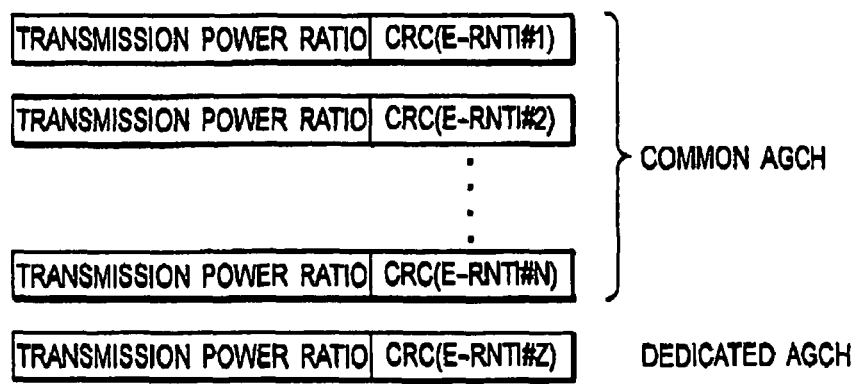
FIG. 8 is a diagram showing an example of an AGCH transmitted by the radio base station of the mobile communication system according to the first embodiment of the present invention.

FIG. 8 shows an example of a format of an E-AGCH to be transmitted by the scheduling section 123/3. The E-AGCH includes two types of channels; a common absolute grant channel (common AGCH) and a dedicated absolute grant channel (dedicated AGCH).

As shown in FIG. 8, an EDPDCH/DPCCH transmission power ratio ("transmission power ratio") and a CRC sequence masked with a mobile terminal identifier (E-RNTI) are mapped to each of the E-AGCH.

Since the radio base station Node B grasps the priority level of each of the mobile stations UE, each of an E-RNTI is not required to show the priority level on the dedicated AGCH. Therefore, single E-RNTI is mapped to the dedicated AGCH. On the other hand, an E-RNTI mapped to a common AGCH differs based on each of the priority levels.

The radio network controller RNC according to the present embodiment is an apparatus located on upper level of the radio base station Node B and configured to control radio communication between the radio base station Node B and the mobile station UE.

Figure 9:
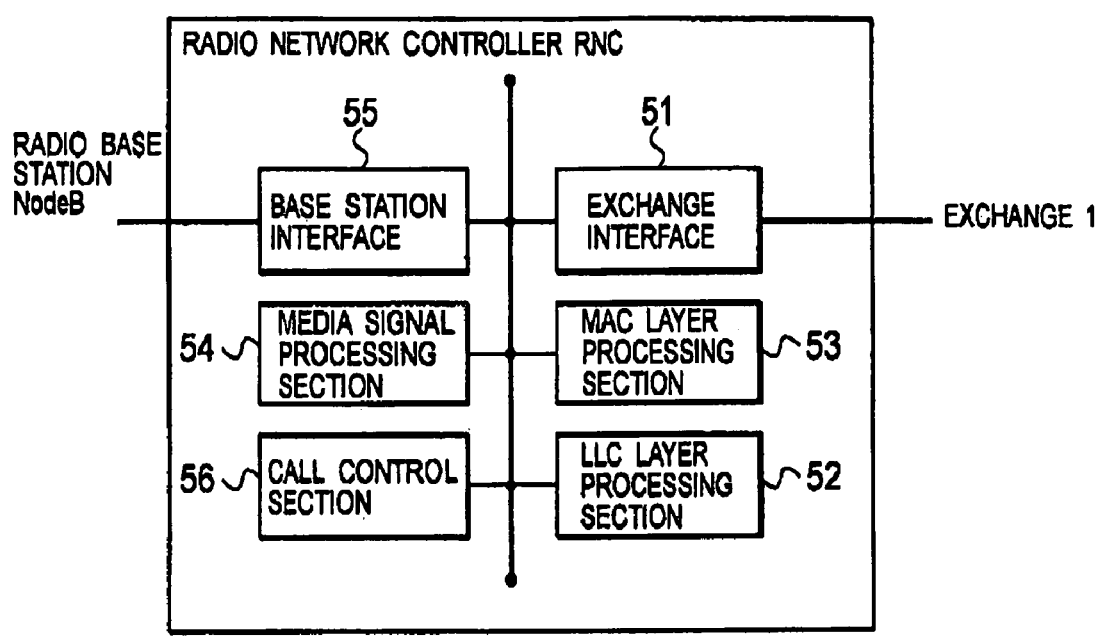
FIG. 9 is a functional block diagram of a radio network controller of the mobile communication system according to the first embodiment of the present invention.

As shown in FIG. 9, the radio network controller RNC according to this embodiment is provided with an exchange interface 51, an LLC layer processing section 52, an MAC layer processing section 53, a media signal processing section 54, a radio base station interface 55, and a call control section 56.

The exchange interface 51 is an interface with an exchange 1. The exchange interface 51 is configured to forward the downlink signals transmitted from the exchange 1 to the LLC layer processing section 52, and to forward the uplink signals transmitted from the LLC layer processing section 52 to the exchange 1.

The LLC layer processing section 52 is configured to perform an LLC (Logical Link Control) sub-layer processing such as a synthesis processing of a header (e.g. a sequence number), a trailer, or the like. The LLC layer processing section 52 is also configured to transmit the uplink signals to the exchange interface 51 and to transmit the downlink signals to the MAC layer processing section 53, after the LLC sub-layer processing is performed.

The MAC layer processing section 53 is configured to perform an MAC layer processing such as a priority control processing, a header granting processing, or the like. The MAC layer processing section 53 is also configured to transmit the uplink signals to the LLC layer processing section 52 and to transmit the downlink signals to the radio base station interface 55 (or a media signal processing section 54), after the MAC layer processing is performed.

The media signal processing section 54 is configured to perform a media signal processing against voice signals or real time image signals. The media signal processing section 54 is also configured to transmit the uplink signals to the MAC layer processing section 53 and to transmit the downlink signals to the radio base station interface 55, after the media signal processing is performed.

The radio base station interface 55 is an interface with the radio base station Node B. The radio base station interface 55 is configured to forward the uplink signals transmitted from the radio base station Node B to the MAC layer processing section 53 (or the media signal processing section 54) and to forward the downlink signals transmitted from the MAC layer processing section 53 (or the media signal processing section 54) to the radio base station Node B.

The call control section 56 is configured to perform a radio resource control processing, a channel setup and an open processing by the layer-3 signaling, or the like. Here, the radio resource control processing includes a call admission control processing, a handover control processing, or the like.

Figure 10:
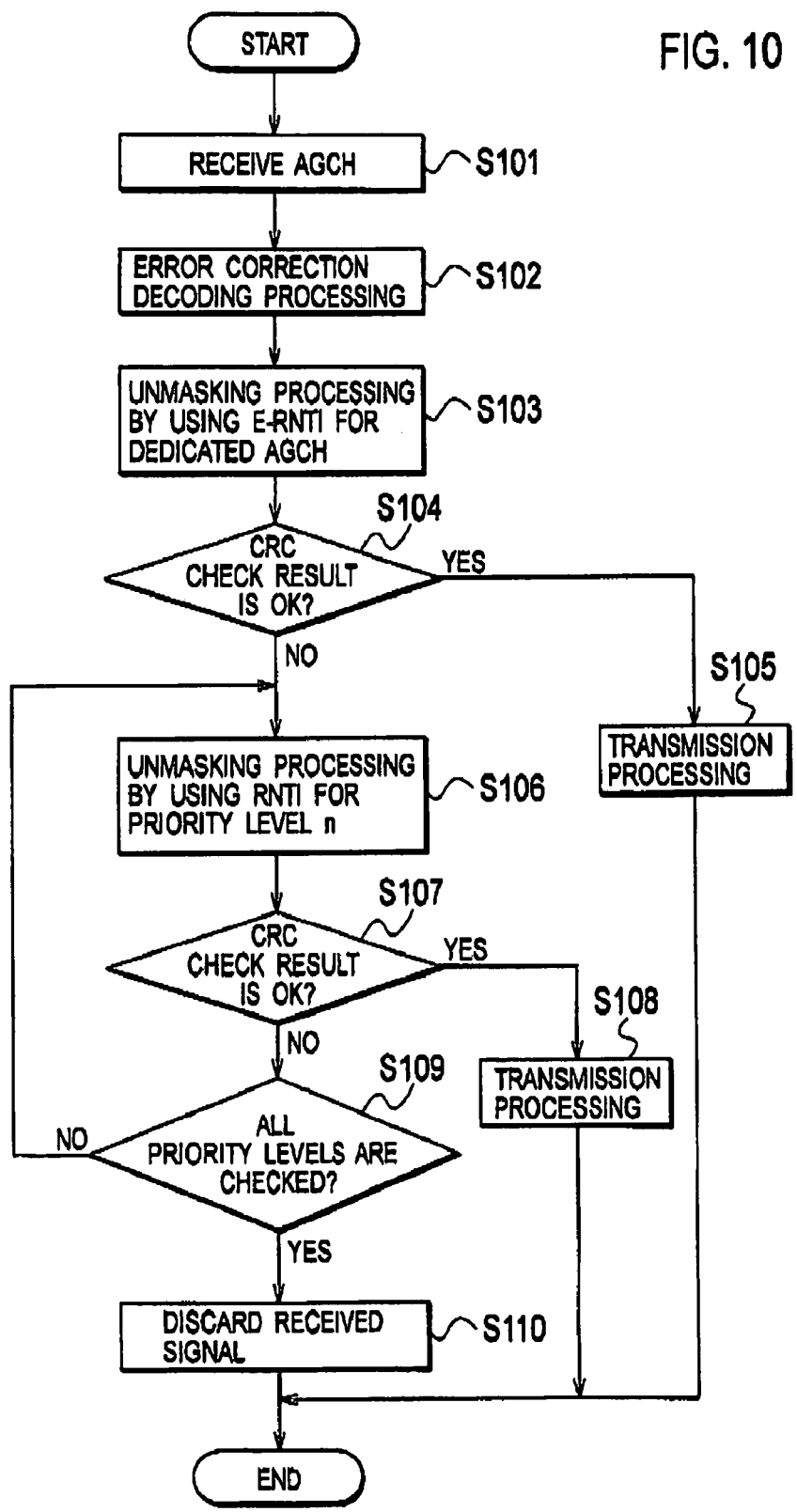
FIG. 10 is a flowchart for explaining a receive processing operation in the mobile communication system according to the first embodiment of the present invention.

With reference to FIG. 10, an operation of a mobile communication system according to the first embodiment of the present invention will be explained. Note that FIG. 10 shows a transmission processing at a radio base station Node B, and FIG. 10 shows a reception processing at a mobile station UE.

As shown in FIG. 10, in step S101, the mobile station UE receives an E-AGCH transmitted from the radio base station. Then, in step S102, the mobile station UE performs an error correction decoding processing against the received E-AGCH.

In step S103, the mobile station UE unmasks a CRC sequence by using an E-RNTI assigned to the dedicated AGCH. Then, in step S104, the mobile station UE performs a CRC check by using the unmasking result.

When the CRC check result is "OK", in step S105, the mobile station UE determines that the received E-AGCH is assigned to the own mobile station UE, and starts a transmission processing based on a transmission power ratio included in the E-AGCH.

On the other hand, when the CRC check result has been "NG", in step S108, the mobile station UE unmasks the CRC sequence by using the E-RNTIs corresponding to the priority level n of the channel to which the own mobile station UE is connected, among the E-RNTIs assigned to the common AGCH. Then, in step S107, the mobile station UE performs the CRC check by using the unmasked result.

When the CRC check result is "OK", in step S108, the mobile station UE determines that the received E-AGCH is commonly assigned to the priority level of the channel to which the own mobile station UE is connected, and starts the transmission processing based on the transmission power ratio included in the E-AGCH.

On the other hand, when the CRC check result has been "NG", in step S109, the mobile station UE determines whether or not a priority level unused for the CRC check exists, of the priority level n of the channel to which the own mobile station UE is connected.

When the unused priority level exists, the processing returns to step S106. When the unused priority level does not exist, in step S110, the mobile station UE determines that the received signal is not addressed to the own mobile station UE, and discards the received signal.

Hereinabove, although the present invention has been described in detail above with the embodiment, it is apparent to those skilled in the art that the present invention is not limited to the embodiment described in the present application. The present invention can be implemented as altered and modified embodiments without departing from the spirit and scope of the present invention as defined by the description of claims. Therefore, the description of the present application is for illustrative purposes and is not intended to limit the present invention in any way.

INDUSTRIAL APPLICABILITY

As described above, the present invention, a transmission can provide a transmission rate control method, a mobile station, and a radio base station that makes it possible to reduce deterioration in a downlink capacity by minimizing an overhead of an E-AGCH by not allocating a priority level as independent bits to the E-AGCH.

What is claimed is:

1. A transmission rate control method, comprising:
   transmitting, at a radio base station, information for controlling an uplink transmission rate in an absolute grant channel including a mobile station identifier;
   judging, at a mobile station, in accordance with the mobile station identifier included in the received absolute grant channel, whether or not the received absolute grant channel is addressed to the mobile station; and
   controlling, at the mobile station, a transmission rate in an uplink in accordance with the absolute grant channel when the judgment result is affirmative; wherein
   the mobile station identifier is defined based on each of priority levels.

2. The transmission rate control method according to claim 1, wherein each of the priority levels is configured not to be used in a dedicated absolute grant channel, but to be used in a common absolute grant channel.

3. A mobile station configured to control a transmission rate in an uplink, comprising:
   a receiver configured to receive an absolute grant channel for controlling an uplink transmission rate including a mobile station identifier from a radio base station;
   a Judging section configured to Judge, in accordance with the mobile station identifier included in the received absolute grant channel, whether or not the received absolute grant channel is addressed to the mobile station; and
   a controller configured to control the transmission rate in the uplink in accordance with the absolute grant channel when the judgment result is affirmative; wherein
   the mobile station identifier is defined based on each of priority levels.

4. A radio base station configured to control a transmission rate in an uplink, comprising:
   a transmission rate controller configured to transmit common information in an absolute grant channel for controlling an uplink transmission rate including a mobile station identifier; wherein the mobile station identifier is defined according to each of priority levels.

* * * * *